United States Patent
Wu et al.

(10) Patent No.: US 8,691,324 B2
(45) Date of Patent: Apr. 8, 2014

(54) DRY COATING PROCESSES FOR SUBSTRATES

(75) Inventors: Yiliang Wu, Oakville (CA); Sandra J. Gardner, Oakville (CA); Ping Liu, Mississauga (CA); Nan-Xing Hu, Oakville (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/438,088

(22) Filed: Apr. 3, 2012

(65) Prior Publication Data
US 2013/0260136 A1 Oct. 3, 2013

(51) Int. Cl.
*C23C 26/00* (2006.01)
*B05D 7/00* (2006.01)

(52) U.S. Cl.
USPC .......................................... 427/11; 427/222

(58) Field of Classification Search
USPC ................................... 427/11, 222
See application file for complete search history.

(56) References Cited

U.S. PATENT DOCUMENTS

| | | | |
|---|---|---|---|
| 7,976,950 B2 * | 7/2011 | Okai et al. | 428/408 |
| 2002/0106444 A1 * | 8/2002 | Menet et al. | 427/8 |
| 2003/0102099 A1 * | 6/2003 | Yadav et al. | 162/208 |
| 2008/0193634 A1 * | 8/2008 | Yaniv et al. | 427/58 |
| 2009/0102046 A1 * | 4/2009 | Dimitrakopoulos et al. | 257/712 |
| 2011/0006276 A1 | 1/2011 | Kim et al. | |

* cited by examiner

*Primary Examiner* — Kelly M Gambetta
(74) *Attorney, Agent, or Firm* — Fay Sharpe LLP

(57) ABSTRACT

Disclosed herein are solvent free, dry coating processes for applying a layered material such as graphene, nanoplate graphite, etc., to a substrate. The applied layered material is devoid of any dispersant and substantially uniform in thickness. Generally, a layered material precursor composition is mixed with a milling medium so that the milling medium is coated with the layered material. The substrate is then contacted with the coated milling medium. The layered material on the milling medium transfers to the substrate to form a coating on the substrate. Such processes may be especially useful for applying conductive films onto a polymeric substrate without the need for additives such as a surfactant or a polymeric binder.

17 Claims, 5 Drawing Sheets
(1 of 5 Drawing Sheet(s) Filed in Color)

DRY COATING PROCESSES FOR SUBSTRATES

BACKGROUND

Layered materials are very useful in broad applications. For example, graphene and nanoplate graphite offer excellent electronic, thermal, and mechanical properties which make them desirable for use in various electronic devices, e.g. as transparent electrodes or conductive films (e.g. for electromagnetic shielding). Graphene and nanoplate graphite may be particularly useful in displays, touch panels, nanocomposite materials, batteries, supercapacitors, thin-film transistors, and hydrogen-storing devices. Large area graphene or nanoplate graphite coatings can also be used as low friction coatings for many applications.

Unfortunately, the deposition of some layered materials, such as graphene and nanoplate graphite, into a large area, uniform film is difficult and expensive because these materials cannot be dispersed at a high concentration in common solvents for conventional coating methods. Conductive films can also be produced via vacuum filtration followed by transfer to the substrate. However, this procedure is complicated and uses large amounts of solvents, which can be expensive during manufacturing. Some solvents are also regulated materials, and compliance with disposal regulations further increases the costs of this procedure.

It would be desirable to develop different processes for depositing layered materials on a substrate.

BRIEF DESCRIPTION

The present application discloses, in various embodiments, dry processes, i.e. processes which are substantially solvent-free, for coating a substrate with a layered material, such as graphene, nanoplate graphite, etc. The processes can be used to produce large area and uniform coatings comprising the layered material which exhibit excellent electronic, thermal, and mechanical properties.

Disclosed in various embodiments herein are processes for applying a coating of a layered material on a substrate. A layered material precursor composition is mixed with a milling medium to form a coated milling medium. The substrate is then contacted with the coated milling medium to form the coating of the layered material on the substrate.

The layered material may be graphene, graphite, a chalcogenide, or a pnictide. In specific embodiments, the layered material comprises graphene and nanoplate graphite.

The chalcogenide may be tin sulfide (SnS), bismuth telluride ($Bi_2Te_3$), bismuth selenide ($Bi_2Se_3$), titanium disulfide ($TiS_2$), molybdenum diselenide ($MoS_2$), niobium disulfide ($NbS_2$), vanadium disulfide ($VS_2$), molybdenum disulfide ($MoS_2$), tungsten disulfide ($WS_2$), or tin disulfide ($SnS_2$). The pnictide may be boron nitride.

The milling medium may be a ceramic, glass, metal, or polymeric material. The milling medium can be in the form of beads or rods. The milling medium may be substantially uniform in size and shape. Alternatively, the milling material may have a varying size and/or shape. The milling material may have an average size of from about 50 μm to about 10 mm. The mixing of the milling medium with the layered material precursor composition can be performed by shaking, agitating, or milling.

The layered material precursor composition may be natural graphite, thermally expandable graphite, expanded graphite, synthetic graphite, chalcogenide flake, or pnictide flake. Desirably, the process is a dry process and the coating of the layered material is as pure as possible. Thus, the layered material precursor composition may be a dry powder. In some embodiments, there is no solvent, surfactant, binder, or dispersant present.

In particular embodiments, the substrate is a paper, a metal substrate, or a polymeric substrate. The polymeric substrate may include a polymer material selected from polyester (e.g. polyethylene terephthalate (PET), polyethylene naphthalate (PEN)), polyimide (PI), polyether ether ketone (PEEK), polycarbonate (PC), polyacrylate (e.g. poly(methyl methacrylate) (PMMA)), polyolefin (e.g. polyethylene (PE), polypropylene (PP), polyamide (e.g. Nylon), polysulfone (PSU), polysaccharide, polyurethane, polysiloxane, epoxy, a copolymer thereof, or a mixture thereof. In specific embodiments, the polymer material is polyethylene terephthalate (PET).

The coating, once applied to the substrate, can further be polished.

Also disclosed herein are methods of coating a substrate with a layer of graphene and nanoplate graphite. Graphite is mixed with beads to coat the beads with graphene and nanoplate graphite. The substrate is then coated with the coated beads to transfer the coated material from the beads to the substrate to form the layer of graphene and nanoplate graphite on the substrate.

The process may further include adding an additional uncoated milling medium to the coated beads prior to contacting the substrate. In some embodiments, the additional milling medium is added to control coating thickness.

Further disclosed are substrates coated with a layered material produced by the process. In some embodiments, the layered material is a low friction coating. The coated substrate may have a dry friction coefficient less than 0.2.

These and other non-limiting characteristics of the disclosure are more particularly disclosed below.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following is a brief description of the drawings, which are presented for the purposes of illustrating the exemplary embodiments disclosed herein and not for the purposes of limiting the same.

DETAILED DESCRIPTION

Figure 1:
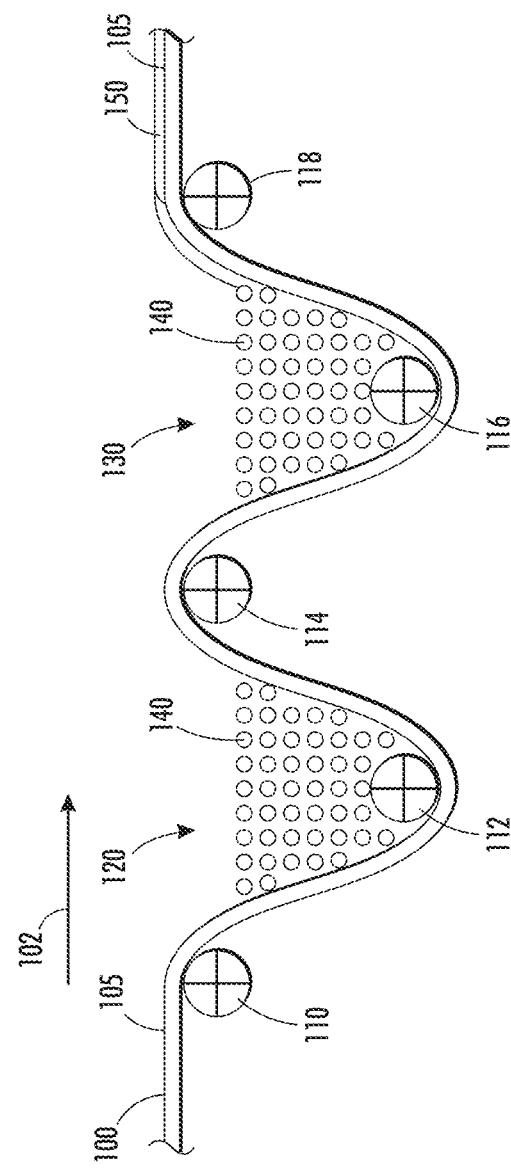
FIG. 1 is a diagram depicting a continuous coating process of the present disclosure.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

The term "graphene" refers to an allotrope of carbon in the form of a planar sheet of $sp^2$-hybridized bonded carbon atoms that are arranged in a hexagonal honeycomb crystal lattice. This sheet is exactly one atom in thickness, so that each atom can be considered a surface atom. In the present disclosure, the term "graphene" is used to refer to both single sheets and to 19 or fewer layers of such sheets that still have the properties of graphene. Each graphene sheet has a height or thickness of about 0.7 nm.

The term "graphite" refers to stacks of 20 or more layers of graphene, typically having a height or thickness of more than 10 nanometers (nm). The distance between adjacent layers of graphene is 0.335 nm. The term "nanoplate graphite" refers to stacks of 20 to about 200 layers of graphene, including from 20 to about 100 layers of graphene. In some embodiments, the nanoplate graphite has a thickness of less than about 200 nm, less than about 100 nm, or less than about 50 nm. Nanoplate graphite is distinguished from natural graphite flake or synthesized graphite flake by its relative thinness. Graphite flakes typically have a thickness of larger than 1 micrometer.

The term "solvent-free" or any reference to the conductive film being free of solvents does not require an absolute absence of solvent. For example, some residual water may be present from the various ingredients or from ambient/atmospheric conditions. Compositions containing such amounts should be considered to still be solvent-free.

The present disclosure relates to processes for coating a substrate with a layered material. Generally, a layered material precursor composition is mixed with a milling medium to transfer and form a coated milling medium. The substrate is then contacted with the coated milling medium to form the coating of the layered material on the substrate.

The layered material that is coated upon the substrate may comprise graphene, nanoplate graphite, a chalcogenide, or a pnictide. Graphene and nanoplate graphite have been discussed above. Chalcogenides are chemical compounds consisting of at least one chalcogen atom and at least one electropositive element. Chalcogens are the elements in Group 16 of the periodic table according to IUPAC nomenclature. Chalcogenides include oxides, sulfides, selenides, and tellurides. A pnictide is a binary compound comprising a Group 15 atom under IUPAC nomenclature. A pnictide is a ternary pnictide if it contains three atoms or a quaternary pnictide if it contains four atoms. Pnictides include nitrides, phosphides, arsenides, antimonides, and bismuthides.

In particular embodiments, the layered material coated upon the substrate is a mixture of graphene and nanoplate graphite. In such a mixture, the weight ratio of graphene to nanoplate graphite may be from about 99.9:0.1 to about 0.1: 99.9, including from about 95:5 to about 1:99, from about 80:20 to about 1:99, or from about 50:50 to about 5:95.

The chalcogenide may contain an electropositive element that is a metal selected from the group consisting of titanium (Ti), vanadium (V), chromium (Cr), manganese (Mn), iron (Fe), cobalt (Co), nickel (Ni), copper (Cu), yttrium (Y), zirconium (Zr), niobium (Nb), molybdenum (Mo), ruthenium (Ru), rhodium (Rh), palladium (Pd), tin (Sn), hafnium (Hf), tantalum (Ta), tungsten (W), rhenium (Re), osmium (Os), bismuth (Bi), and iridium (Ir). In specific embodiments, the chalcogenide is not an oxide.

The chalcogenide may be tin sulfide (SnS), or may alternatively be a metal dichalcogenide. In some embodiments, the metal chalcogenide is a transition metal dichalcogenide. In some embodiments, the metal dichalcogenide is titanium disulfide ($TiS_2$), molybdenum diselenide ($MoSe_2$), niobium disulfide ($NbS_2$), vanadium disulfide ($VS_2$), molybdenum disulfide ($MoS_2$), or tungsten disulfide ($WS_2$). In more particular embodiments, the metal dichalcogenide is molybdenum disulfide ($MoS_2$) or tungsten disulfide ($WS_2$). Other non-limiting chalcogenides include tin sulfide (SnS), bismuth telluride ($Bi_2Te_3$), bismuth selenide ($Bi_2Se_3$), and tin disulfide ($SnS_2$).

The pnictide may be boron nitride (BN).

The layered material of a chalcogenide or a pnictide may be in the form of a nanosheet. The thickness of the nanosheet in the layered material that is coated upon the substrate may be similar to the graphene and nanoplate graphite discussed before.

The layered material precursor composition is typically a large unbroken block of the layered material, for example, graphite flakes. For example, the layered material precursor composition for graphene or nanoplate graphite may be a large chunk of natural graphite. Natural graphite generally comes in three types: crystalline flake graphite, amorphous graphite, and lump graphite. Crystalline flake graphite occurs naturally as isolated, flat, plate-like particles with hexagonal edges. Amorphous graphite occurs as fine particles and results from the thermal metamorphism of coal. Lump graphite occurs in fissure veins or fractures and appears as massive platy intergrowths of fibrous or acicular crystalline aggregates. The natural graphite may be broken down into graphene or nanoplate graphite by mixing with a milling medium, which breaks the graphite into graphene and nanoplate graphite. Graphite flakes are also commercially available, for example from Sigma-Aldrich.

The layered material precursor composition for graphene or nanoplate graphite could also be thermally expandable graphite, expanded graphite, or synthetic graphite. Thermally expandable graphite is a processed graphite wherein a guest molecule is intercalated between graphene layers of a graphite crystal or particle. After intercalation, the resulting thermally expandable graphite can exhibit different physical and/or chemical properties, including crystallographic structure, surface area, density, electronic properties, intumescent behavior, and chemical reactivity. Non-limiting examples of guest molecules include halogens, alkali metals, sulfates, sulfides, nitrates, organic acids, and metal halides. Expanded graphite is produced by forcing the crystal lattice planes of flake graphite apart. Flake graphite may be immersed in an acid bath to produce expanded graphite. Synthetic graphite is obtained by graphitizing non-graphitic carbon, for example by chemical vapor deposition from hydrocarbons at temperatures above 2500 K, by decomposition of thermally unstable carbides, or by crystallizing from metal melts supersaturated with carbon.

The layered material precursor composition is then mixed with a milling medium to break up or decompose the precursor composition. The milling medium becomes coated with the layered material.

The milling medium may be a ceramic, glass, metal, or polymeric material. The milling medium may be in the form of beads (i.e. substantially spherical) or rods (i.e cylinders). For example, the milling medium can be glass beads, stainless steel beads, or plastic beads such as polytetrafluoroethylene (PTFE) beads.

The ceramic material may be an oxide, a nonoxide, or a composite thereof. Non-limiting examples of oxides include alumina ($Al_2O_3$), beryllia (BeO), ceria ($CeO_2$), and zirconia ($ZrO_2$). Non-limiting examples of nonoxides include carbides, borides, nitrides, and silicides.

The milling medium may have any suitable size or shape. In some embodiments, the milling material has a uniform size and shape. Alternatively, the size and/or shape of the milling material may vary. For example, the milling material may be a set of glass beads, of which 95% have a size of about 1 mm. These glass beads could be considered to have a uniform size and shape. As another example, the milling material may be a set of beads, 50% having a size of about 1 mm and 50% having a size of about 0.5 mm. This set of beads could be considered to have a varying size.

The milling medium may have an average size of from about 50 micrometers (μm) to about 10 millimeters (mm), or from about 100 micrometers (μm) to about 5 millimeters (mm). In some specific embodiments, the milling medium has an average size of about 1 mm or about ⅛ of an inch, i.e. 3.175 millimeters (mm). In specific embodiments, the milling medium is uniformly sized and shaped metal shots having a diameter of ⅛ of an inch. Such shots are commercially available from Hoover Precision Products.

The layered material precursor composition and the milling medium are mixed by any method that results in contact between the precursor composition and the milling medium. For example, they can be mixed by shaking, agitation, or milling. Exemplary mixing methods including shaking in an acoustic mixer such as a Resodyn™ acoustic mixer, milling in a ball milling machine, shaking with a high frequency shaker, etc. After mixing, a coated milling medium is obtained, the coating being formed from layered material that has been broken off and separated from the precursor composition.

The substrate is then contacted with the coated milling medium to form a coating of the layered material on the substrate. The milling medium carrying the layered materials rolls over the surface of the substrate, and transfers the layered materials onto the substrate. Both batch processes and continuous processes for contacting the substrate with the coated milling medium are contemplated. For example, in a batch process, the substrate can simply be placed in a container which is at least partially filled with the coated milling medium, the container can then be shaken. The container can be made from a material that is selected to minimize the amount of layered coating material that adheres to the container (instead of the substrate). For example, the container could be made from a material that has low surface energy.

If desired, additional uncoated milling medium may be added to the coated milling medium prior to contacting the substrate. This may be useful in controlling the thickness of the coating/layer on the substrate.

As another example, FIG. 1 depicts a continuous process for coating a substrate. Here, the substrate is represented as a web 100 moving in the direction indicated by arrow 102. The web rolls over wheels that are situated to form at least one valley. Here, there are five wheels 110, 112, 114, 116, 118 that form two valleys 120, 130. The coated milling medium, shown here as beads 140, can fill the valleys and thus roll over the upper surface 105 of the web, transferring the layered material to the upper surface. This forms a coating 150 of the layered material on the substrate. The coating of layered material can be applied to one or both sides of the substrate. The coating of layered material can also be applied to the entire surface of the substrate, or only a portion of the substrate. Only a portion of the substrate can be coated by masking the parts of the substrate that are to be left uncoated, or by running the substrate past the milling medium so that only the desired parts of the substrate are contacted by the coated milling medium.

The coating of layered material after deposition may be highly uniform and relatively smooth. The coated layer may have a thickness of from about 10 nanometers to about 20 micrometers, including from about 10 nanometers to about 15 micrometers, or from about 20 nanometers to about 10 micrometers. Depending on the desired applications, in some embodiments, the thickness is from about 10 nm to about 1 micrometer, including from about 20 nm to about 500 nm. In other embodiments, the thickness is from about 500 nm to about 20 micrometers including from about 1 micrometer to about 15 micrometers. In some embodiments, the coated layer has a high transparency, for example, at least about 50%, including at least 60%, or at least 80%. High transparency is desirable for certain applications such as for transparent conductors in tough screen applications. Transparency is measured as the percentage of light transmission according to ASTM D1003. The layered material is deposited with the "plate" or nanosheet surface substantially parallel to the surface of the substrate, and forms a continuous film. In other words, the layered material is generally laid down on the surface of the substrate.

The coating of layered material may be conductive or semiconductive, depending on the electrical property of the precursor material. For example, layered graphene, nanoplate graphite material, or $NbSe_2$ can be used to form a conductive layer. In contrast, layered $WS_2$ forms a semiconducting layer. As to the conductive coating comprising the layered materials, the conductivity for example may be from about 0.001 S/cm to about 10000 S/cm, including from about 0.001 S/cm to about 1000 S/cm, or from about 0.001 S/cm to about 100 S/cm, as measured by standard 4-probe method.

The resulting coating layer may have a relatively small surface roughness. Surface roughness is a measure of the texture of a surface, and can be determined using root mean square methods and devices known in the art. A low surface roughness is generally desirable because rough surfaces are typically more susceptible to wear and have higher coefficients of friction. Accordingly, high surface roughness may be indicative of low mechanical performance. The conductive layer may have a small surface roughness of from about 1 nanometer to about 100 nanometers, including from about 5 nanometers to about 80 nanometers.

After the coating of layered material is formed on the substrate, the coating may further be heat treated as well. In embodiments, the heat treatment can be performed by exposing the coating to a suitable temperature for a period of from about 1 second to about 30 minutes. The temperature may depend on the type of substrate used.

After coating the layered material onto the substrate, the process may further comprise a polishing step or a rubbing step. The coated layered material may be rubbed using a smooth surface or polished with a polish machine. This additional step removes some coating defects, e.g. removing some big particles in the coated layer; filling some gaps or voids; and/or applying pressure to compress the layered materials into a densely packed layer. The additional step provides some benefit to the final layered material coating, for example, enhanced conductivity, increased transparency, and/or reduced surface roughness, and the like.

Advantageously, the coating processes of the present disclosure are "dry-coating" processes. In other words, the processes may be performed without the use of any solvents. In addition, no additives, such as surfactants or dispersants, are needed to dissolve the layered material in the solvent. This reduces costs and simplifies the coating processes. In further embodiments, it is contemplated that the coating of layered material is as pure as possible. Put another way, there is no polymeric binder in the coating. Similarly, the layered material precursor composition itself is contemplated to include no solvent, surfactant, or polymeric binder. Put another way, in some embodiments, the coating of layered material consists essentially of the layered material, or consists of the layered material. The processes are also scalable to large-area coating. In other embodiments, polymeric binders may be applied after the coating is formed to further increase mechanical durability of the coating.

The substrate upon which the coating of layered material is deposited may be any suitable material, such as paper, silicon, glass, or a polymeric material. Suitable polymeric materials include both plastic materials and elastomeric materials. For structurally flexible devices, a polymeric substrate, such as for example polyester such as polyethylene terephthalate (PET) and polyethylene napthalate (PEN), polyimide (PI), polyether ether ketone (PEEK), polycarbonate (PC), polyacrylate such as poly(methyl methacrylate) (PMMA), polyolefin such as polyethylene (PE) and polypropylene, polyamide such as Nylon, polysulfone (PSU), polysaccharide, polyurethane, polysiloxane, epoxy, and the like, and copolymers and mixtures thereof may be used. The thickness of the substrate may be from about 10 micrometers to over 10 millimeters with an exemplary thickness being from about 50 micrometers to about 2 millimeters, especially for a flexible polymeric substrate, and from about 0.4 millimeters to about 10 millimeters for a rigid substrate such as glass or silicon.

Also disclosed in specific embodiments are methods of coating a polymeric substrate with a layer of graphene and nanoplate graphite. Graphite is mixed with beads to coat the beads with graphene and nanoplate graphite. The polymeric substrate is then contacted with the coated beads to transfer and form the layer of graphene and nanoplate graphite on the polymeric substrate.

It should be noted that the present methods described herein are different from conventional Chemical Vapor Deposition (CVD) or Atomic Layer Deposition (ALD) processes in several aspects. First, the starting material is different. CVD or ALD often use molecular compounds as the precursor materials, whereas the precursor materials here are not molecular compounds. Second, the mechanism is different. CVD and ALD use a "bottom-up" approach to grow layered materials from molecules, while the present methods use a "top-down" approach to break the precursor materials into a layered material. Third, the processes are different. CVD or ALD processes requires high vacuum in the deposition process. Vacuum is not necessary for the present methods described herein, which can be performed at ambient pressures.

The processes of the present disclosure result in a layer or coating of layered material on the substrate. Especially when the layered material is a conductive substance like graphene or graphite, the resulting conductive layer can be used for conductive electrodes, conductive pads, conductive lines, conductive tracks, and the like in electronic devices such as thin-film transistors, organic light emitting diodes, RFID (radio frequency identification) tags, photovoltaic devices, and other electronic devices which require conductive elements or components. A large area, uniform and conductive coating of the layered materials can also be used for electromagnetic shielding applications. In some embodiments, the layer or coating of layered materials on the substrate is a low friction coating. Such layered materials include graphene, nanoplate graphite, or dichalcogenides such as molybdenum disulfide ($MoS_2$) or tungsten disulfide ($WS_2$). In embodiments, the coated substrate with the layered material has a dry static friction coefficient of less than about 0.2, including less than about 0.1, or less than about 0.08, against the layered material itself. It should be noted that most dry materials in combination have friction coefficient values between 0.3 and 0.6. In comparison, the disclosed coating process and the resulting coating offer a significantly lower friction coefficient. In some embodiments, the resulting conductive elements are used in thin-film transistors (TFTs).

Figure 2:
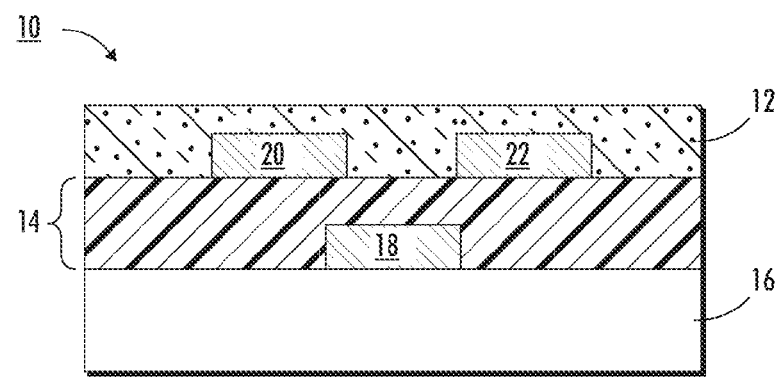
FIG. 2 is an embodiment of a thin film transistor containing a coated layer produced according to a process of the present disclosure.

FIG. 2 illustrates a bottom-gate bottom-contact TFT configuration. The TFT 10 comprises a base support 16 in contact with the gate electrode 18 and a gate dielectric layer 14. The gate electrode 18 is depicted here atop the base support 16, but the gate electrode could also be located in a depression within the base support. The gate dielectric layer 14 separates the gate electrode 18 from the source electrode 20, drain electrode 22, and the semiconducting layer 12. The semiconducting layer 12 runs over and between the source and drain electrodes 20 and 22. The semiconductor has a channel length between the source and drain electrodes 20 and 22.

While FIG. 2 illustrates a bottom gate bottom-contact TFT configuration, other TFT configurations are also contemplated. For example, a bottom-gate top-contact TFT comprising a base support in contact with a gate electrode and a gate dielectric layer and having a semiconducting layer placed on top of the gate dielectric layer to separate it from source and drain electrodes is also contemplated.

Furthermore, a bottom-gate bottom-contact TFT comprising a base support which also acts as a gate electrode and is in contact with a gate dielectric layer wherein a source electrode, a drain electrode, and a semiconducting layer are located atop the gate dielectric layer is also contemplated.

Additionally, a top-gate top-contact TFT comprising a base support in contact with a source electrode, a drain electrode, and a semiconducting layer is also contemplated. The semiconducting layer may run over and between the source and drain electrodes. A gate dielectric layer is on top of the semiconducting layer and a gate electrode is on top of the gate dielectric layer and does not contact the semiconducting layer.

The processes of the present disclosure could be used, for example, to form any of the gate electrode, source electrode, or drain electrode. The thickness of the gate electrode may range for example from about 10 to about 2000 nm. Typical thicknesses of source and drain electrodes are, for example, from about 40 nm to about 1 micrometer, with a more specific thickness being about 60 to about 400 nm.

The insulating dielectric layer generally can be an inorganic material film or an organic polymer film. Illustrative examples of inorganic materials suitable as the insulating layer include silicon oxide, silicon nitride, aluminum oxide, barium titanate, barium zirconium titanate and the like; illustrative examples of organic polymers for the insulating layer include polyesters, polycarbonates, poly(vinyl phenol), polyimides, polystyrene, poly(methacrylate)s, poly(acrylate)s, epoxy resin and the like. The thickness of the insulating layer is, for example from about 10 nm to about 500 nm depending on the dielectric constant of the dielectric material used. An exemplary thickness of the insulating layer is from about 100 nm to about 500 nm. The insulating layer may have a conductivity that is for example less than about $10^{-12}$ S/cm.

Situated, for example, between and in contact with the insulating layer and the source/drain electrodes is the semiconductor layer wherein the thickness of the semiconductor layer is generally, for example, about 10 nanometers (nm) to about 1 micrometer (μm), or about 40 to about 100 nanometers (nm). Any semiconductor material may be used to form this layer. Exemplary semiconductor materials include regioregular polythiophenes, oligothiophenes, pentacene, and other semiconducting polymers known in the art. Any suitable technique may be used to form the semiconductor layer. One such method is to apply a vacuum of about $10^{-5}$ to $10^{-7}$ torr to a chamber containing a substrate and a source vessel that holds the semiconductor in powdered form, then heat the vessel until the compound sublimes onto the substrate. The semiconductor layer can also generally be fabricated by solution processes such as spin coating, casting, screen printing, stamping, or jet printing of a solution or dispersion of the semiconductor.

The insulating dielectric layer, the gate electrode, the semiconductor layer, the source electrode, and the drain electrode may be formed in any sequence, particularly where in embodiments the gate electrode and the semiconductor layer both contact the insulating layer, and the source electrode and the drain electrode both contact the semiconductor layer. The phrase "in any sequence" includes sequential and simultaneous formation. For example, the source electrode and the drain electrode can be formed simultaneously or sequentially.

The various components of the TFT may be deposited upon the substrate in any order. Generally, however, the gate electrode and the semiconducting layer should both be in contact with the gate dielectric layer. In addition, the source and drain electrodes should both be in contact with the semiconducting layer. The phrase "in any order" includes sequential and simultaneous formation. For example, the source electrode and the drain electrode can be formed simultaneously or sequentially. The term "on" or "upon" the substrate refers to the various layers and components with reference to the substrate as being the bottom or support for the layers and components which are on top of it. In other words, all of the components are on the substrate, even though they do not all directly contact the substrate. For example, both the dielectric layer and the semiconducting layer are on the substrate, even though one layer is closer to the substrate than the other layer.

Figure 7:
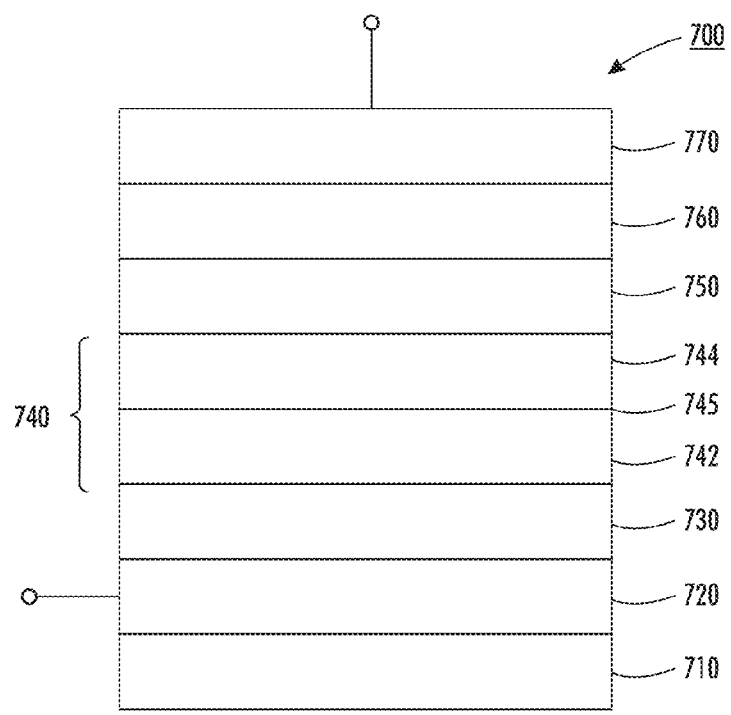
FIG. 7 is a cross-sectional view of an exemplary photovoltaic device that can have a component formed by the processes of the present disclosure.

FIG. 7 is a side cross-sectional view of an exemplary photovoltaic device 700, such as a solar cell. A substrate 710 is provided. A first electrode, such as anode 720, is located upon the substrate 710. A semiconducting layer 740 is then located upon the anode 720. In some embodiments, such as the one depicted here, the semiconducting layer 740 may be made from layers of different materials, shown here as a first sublayer 742 and a second sublayer 744. The first sublayer 742 is located closer in distance to the anode 720 than the second sublayer 744. A junction 745 is formed between the first sublayer 742 and the second sublayer 744. An optional electron blocking layer 730 may be located between the anode 720 and the first sublayer 742, if desired. An electron transporting layer 750 contacts the second sublayer 744 of the semiconducting layer 740. An optional hole blocking layer 760 is located on the electron transporting layer 750. Finally, a second electrode, such as cathode 770, is placed upon the substrate 710 and on the hole blocking layer 760. The second sublayer 744 of the semiconducting layer 740 is closer to the cathode 770 than the first sublayer 742. It should also be noted that the anode 720 is located closer to the substrate 710 than cathode 770.

Only the substrate 710, anode 720, semiconducting layer 740, electron transporting layer 750, and cathode 770 are required to produce a functioning photovoltaic device. However, the additional layers are also helpful in obtaining a highly efficient photovoltaic device. When described in other terms, the semiconducting layer 740 is located between the anode 720 and the cathode 770. Also, the electron transporting layer 750 is located between the second sublayer 744 and the cathode 770. The hole blocking layer 760 is located between the second sublayer 744 and the cathode 770 as well. When both an electron transporting layer and hole blocking layer are present, the hole blocking layer 760 is located between the electron transporting layer 750 and the cathode 770.

The substrate 710 of the photovoltaic device supports the other components of the photovoltaic device. The substrate should also be optically transparent in at least the NIR range of the spectrum, to allow light to pass through and contact the semiconducting layer. Generally, the substrate is composed of materials as previously described for the substrate of a thin film transistor.

The anode 720 or cathode 770 may be made from the palladium precursor composition, or using materials as previously described for the electrodes of a thin film transistor. The semiconducting layer 740 can be made using materials as previously described for the electrodes of a thin film transistor.

The electron transporting layer 750 is located between the semiconducting layer 740 and the cathode 770. This layer is generally made from a material which allows electrons to move efficiently, and may also absorb some light wavelengths. Exemplary materials for the electron transporting layer include $C_{60}$ fullerene, [6,6]-phenyl-$C_{61}$-butyric acid methyl ester (PCBM), $C_{70}$ fullerene, [6,6]-phenyl-$C_{71}$-butyric acid methyl ester (PC[70]BM), or any fullerene derivative. The electron transporting layer may have a thickness of from about 5 nanometers to about 100 nanometers.

An electron blocking layer 730 may be present between the anode 720 and the semiconducting bilayer 740. This layer prevents recombination at the anode by inhibiting the movement of electrons to the anode. Exemplary materials include poly(3,4-ethylenedioxythiophene):poly(styrene sulfonic acid) (PEDOT:PSS), $MoO_3$, and $V_2O_5$. The electron blocking layer may have a thickness of from about 1 nanometers to about 100 nanometers.

A hole blocking layer 760 may also be located between the electron transporting layer 750 and the cathode 770. Exemplary hole blocking materials for this layer include bathocuproine (BCP), lithium fluoride, and bathophenanthroline. The hole blocking layer may have a thickness of from about 0.1 nanometers to about 100 nanometers.

The following examples are for purposes of further illustrating the present disclosure. The examples are merely illustrative and are not intended to limit the processes set forth herein.

EXAMPLES

Example 1

0.1 grams of graphite flakes (from Sigma-Aldrich) were mixed with 4.0 grams of glass beads. The glass beads had a diameter of about 1 millimeter. The mixture was shaken for 30 minutes. After the mixture was shaken, the surface of the beads became black, indicating that the beads were coated with graphene and nanoplate graphite.

One side of a polyethylene terephthalate (PET) substrate was covered with Scotch tape. The substrate was placed in contact with the glass bead mixture and shaken for 30 minutes. After shaking, the uncovered surface of the PET substrate and the Scotch tape were covered with graphene and nanoplate graphite. Each surface of the substrate became highly conductive. The resistance of the Scotch tape side was measured using a two-probe ohm meter at 150 ohms for a length of about 5 cm and the resistance of the PET film was measured at 1,500 ohms for a length of about 5 cm. As a point of reference, a similar resistance measurement for indium-tin oxide (ITO) glass (5 cm in length) was 500 ohms.

Figure 3:
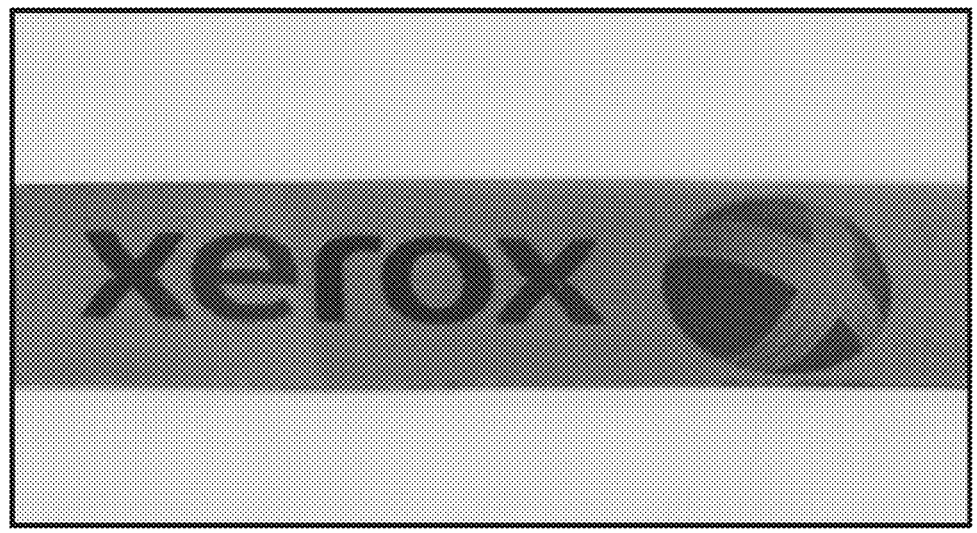
FIG. 3 is an image of a graphene/nanoplate graphite coated polyethylene terephthalate (PET) substrate produced in accordance with an embodiment of the present disclosure.

The graphene/nanoplate graphite coated PET substrate was placed atop a Xerox logo. FIG. 3 is a picture that was taken of the Xerox logo through the coated substrate, and shows that the graphene/nanoplate graphite coating was semi-transparent. The PET was about 125 micrometers thick and the graphene/nanoplate graphite coating was about 300 nanometers thick.

The conductive coating exhibited excellent adhesion to the PET substrate and was stable toward both solvents and heat treatments. After washing with isopropyl alcohol (IPA) and toluene, no damage to the coating was observed. Additionally, the resistance remained the same, indicating no change of the conductivity.

The coated substrate was thermally treated on a hotplate in air at a temperature of 150° C. for 24 hours. After the 24 hour treatment, conductivity was measured again. No change in conductivity was measured.

Figure 4:
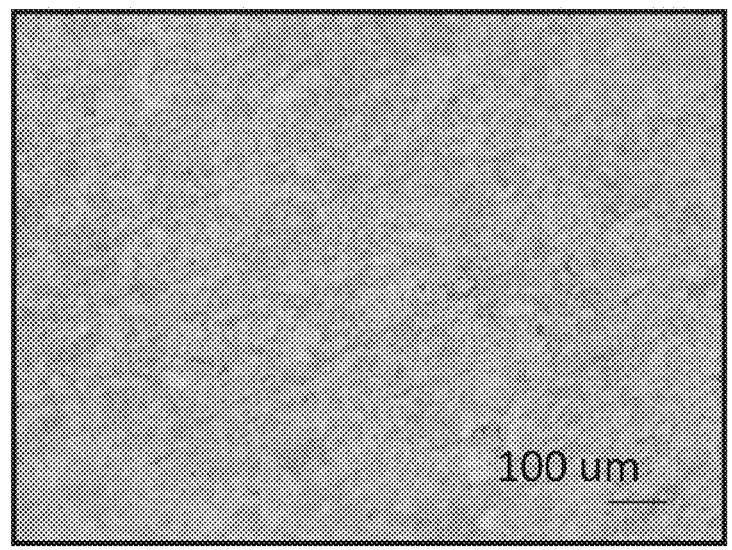
FIG. 4 is a higher resolution image of the graphene/nanoplate graphite coated surface of the substrate of FIG. 3.

FIG. 4 is an optical image of the graphene/nanoplate graphite coating. The surface was very uniform. No particles or agglomerates were observed.

Figure 5:
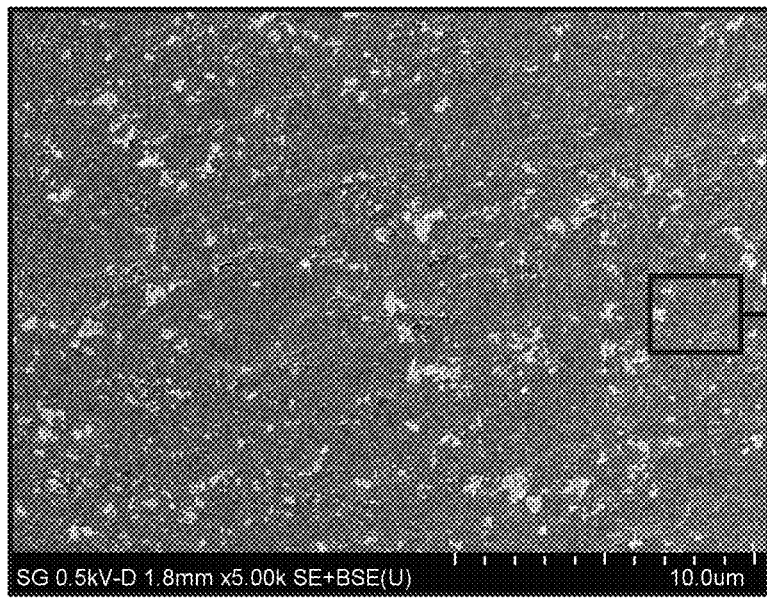
FIG. 5 is a first scanning electron microscope (SEM) image of the coating of FIG. 3.
Figure 6:
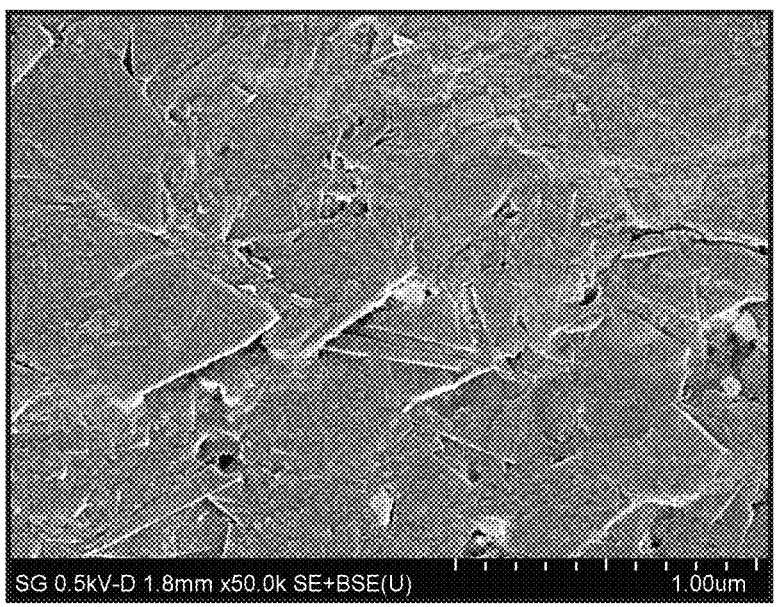
FIG. 6 is a second scanning electron microscope (SEM) image of the coating of FIG. 3.

The coating was further investigated via scanning electron microscopy (SEM). FIG. 5 and FIG. 6 are SEM images of the surface taken at different resolutions. As illustrated in these figures, the graphene/nanoplate graphite was oriented parallel to the PET surface and was densely packed into a continuous film.

Example 2

0.2 grams of natural graphite was placed in a 60 milliliter bottle. Metal shots (from Hoover Precision Product) having a diameter of one-eighth of an inch were added to fill half of the volume of the bottle. The mixture was milled on a milling machine for 3 hours. The metal shots became black, indicating that the surfaces of the shots were coated with graphene and nanoplate graphite.

Approximately 20 of the coated metal shots were removed and transferred to a second bottle. Fresh, i.e. clean, metal shots were added to the second bottle until half the volume of the bottle was filled. The mixture of the second bottle was milled for 30 minutes. All of the metal shots became black.

A PET substrate was inserted into the second bottle which was then shaken for 10 minutes, resulting in a smooth, shiny graphite/nanoplate graphene coating on both sides of the PET substrate. The surface conductivity of the coating was measured to be similar to the conductivity measured in Example 1.

The use of the second bottle illustrated that the graphene/nanoplate graphite can be "diluted" in the processes of the present disclosure. This can allow for fine control over the thickness and content of the coating of layered material.

Example 3

0.2 grams of graphite flakes (from Sigma-Aldrich) were mixed with 40.0 grams of glass beads. The glass beads had a diameter of about 1 millimeter. The mixture was shaken for 5 minutes using a Resodyn™ Acoustic Mixer (LabRAM Mixer). The surface of the beads became black immediately, indicating that the beads were coated with graphene and nanoplate graphite. A piece of PET substrate (2 centimeters by 5 centimeters) was immersed in the coated beads, and the container with the PET was allowed to shake in the LabRAM Mixer for 5 minutes, resulting in a smooth, shiny graphite/nanoplate graphene coating on both sides of the PET substrate.

Example 4

The sample produced in Example 1 (coating on PET) was rubbed with a smooth paper for 5 minutes. Some graphene or nanoplate graphite transferred onto the paper. The resistance of the resulting coating on PET was measured to be 900 ohms. Rubbing the surface of the layered material coating reduced the resistance.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The invention claimed is:

1. A process for applying a coating of a layered material on a substrate, comprising:
   mixing a layered material precursor composition with a milling medium to form a coated milling medium; and
   contacting the substrate with the coated milling medium to transfer the layered material from the coated milling medium to the substrate and form the coating of the layered material on the substrate;
   wherein the layered material comprises graphene, nanoplate graphite, a chalcogenide, or a pnictide.

2. The process of claim 1, wherein the layered material comprises graphene and nanoplate graphite.

3. The process of claim 1, wherein the chalcogenide is tin sulfide (SnS), bismuth telluride ($Bi_2Te_3$), bismuth selenide ($Bi_2Se_3$), titanium disulfide ($TiS_2$), molybdenum diselenide ($MoS_2$), niobium disulfide ($NbS_2$), vanadium disulfide ($VS_2$), molybdenum disulfide ($MoS_2$), tungsten disulfide ($WS_2$), or tin disulfide ($SnS_2$).

4. The process of claim 1, wherein the pnictide is boron nitride (BN).

5. The process of claim 1, wherein the milling medium is a ceramic, glass, metal, or polymeric material.

6. The process of claim 1, wherein the milling medium is in the form of beads or rods.

7. The process of claim 1, wherein the milling medium has an average size of from about 50 micrometers (μm) to about 10 millimeters (mm).

8. The process of claim 1, wherein the milling medium is substantially uniform in size and shape.

9. The process of claim 1, wherein the mixing is performed by shaking, agitating, or milling.

10. The process of claim 1, wherein the layered material precursor composition is natural graphite, thermally expandable graphite, expanded graphite, synthetic graphite, chalcogenide flake, or pnictide flake.

11. The process of claim 1, wherein the layered material precursor composition is natural graphite, an expandable graphite, or a synthetic graphite.

12. The process of claim 1, wherein the process is a dry coating process; and wherein the layered material precursor composition is substantially free of any solvent.

13. The process of claim 1, wherein the substrate is a paper, a metal substrate, or a polymeric substrate.

14. The process of claim 13, wherein the polymeric substrate is a polyester, polyimide (PI), polyether ether ketone (PEEK), polycarbonate (PC), polyacrylate, polyolefin, polyamide, polysulfone, polysaccharide, polyurethane, polysiloxane, epoxy, a copolymer thereof, or a mixture thereof.

15. The process of claim 1, further comprising polishing the coating.

16. A method of coating a substrate with a layer of graphene and nanoplate graphite, comprising:
   mixing graphite with a milling medium to coat the milling medium with graphene and nanoplate graphite; and
   contacting the substrate with the coated milling medium by rolling the coated milling medium over the substrate, to transfer the coated material from the milling medium to the substrate to form a substantially uniform layer of graphene and nanoplate graphite on the substrate.

17. The method of claim 16, further comprising adding to the coated milling medium an additional uncoated milling medium prior to contacting the substrate to control the coating thickness.

* * * * *